J. B. JOHNSON,

Assignor, by mesne assignments, to HIMSELF and A. FULLER.

Machinery for Shaping Boot and Shoe Soles.

No. 9,245. Reissued June 8, 1880.

Witnesses.
C. H. Foster
G. D. Noyes

Inventor.
Joseph B. Johnson

N. PETERS, PHOTO-LITHOGRAPHER, WASHINGTON, D. C.

J. B. JOHNSON,

Assignor, by mesne assignments, to HIMSELF and A. FULLER.

Machinery for Shaping Boot and Shoe Soles.

No. 9,245. Reissued June 8, 1880.

Witnesses.
C. H. Foote
G. D. Noyes

Inventor.
Joseph B. Johnson

N. PETERS, PHOTO-LITHOGRAPHER, WASHINGTON, D. C.

J. B. JOHNSON,

Assignor, by mesne assignments, to HIMSELF and A. FULLER.

Machinery for Shaping Boot and Shoe Soles.

No. 9,245. Reissued June 8, 1880.

Witnesses.
C. H. Fiske
G. D. Noyes

Inventor.
Joseph B. Johnson

H. PETERS, PHOTO-LITHOGRAPHER, WASHINGTON, D. C.

UNITED STATES PATENT OFFICE.

JOSEPH B. JOHNSON, OF LYNN, MASSACHUSETTS, ASSIGNOR, BY MESNE ASSIGNMENTS, TO HIMSELF AND ARTHUR FULLER.

MACHINERY FOR SHAPING BOOT AND SHOE SOLES.

SPECIFICATION forming part of Reissued Letters Patent No. 9,245, dated June 8, 1880.

Original No. 141,058, dated July 22, 1873. Application for reissue filed January 12, 1880.

*To all whom it may concern:*

Be it known that I, JOSEPH B. JOHNSON, of Lynn, county of Essex and State of Massachusetts, have invented a new and useful Machine for Shaping or Molding Soles on Shoes or fixed to the uppers thereof; and I do hereby declare the same to be fully described in the following specification, and represented in the accompanying drawings, of which—

Figure 1:
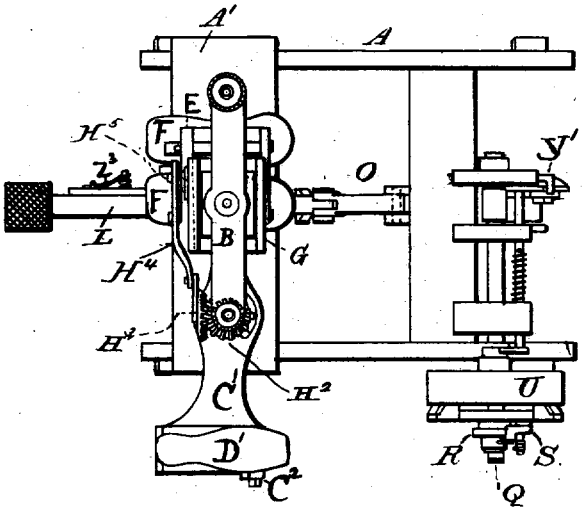
Figure 3:
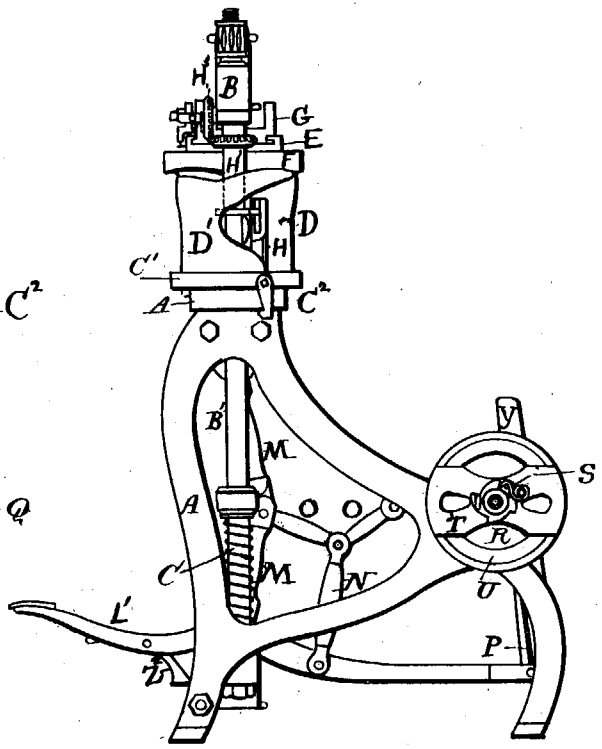
Figure 2:
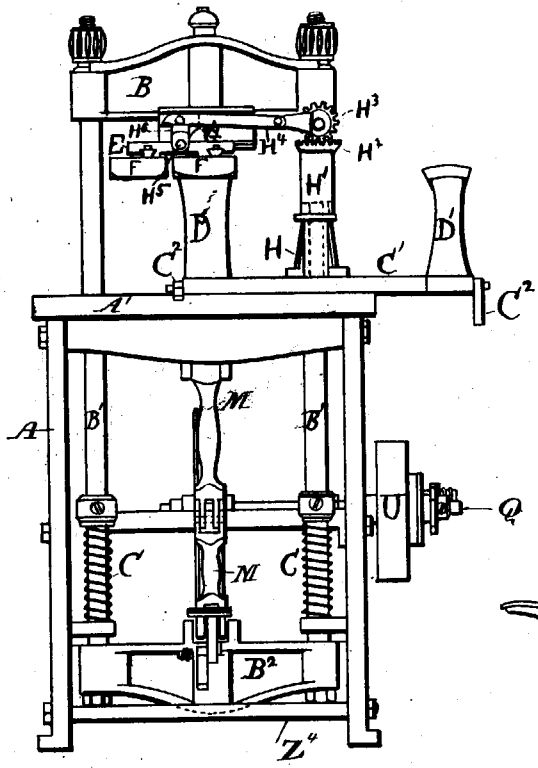
Figure 4:
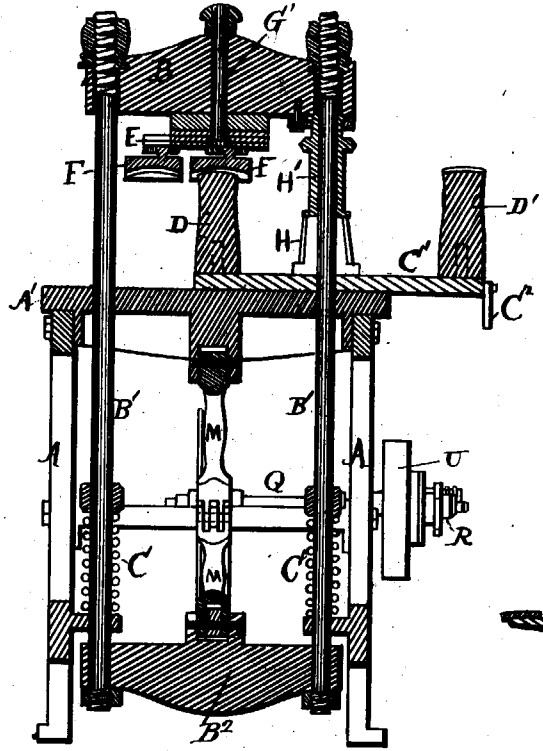

Figure 1 is a top view; Fig. 2, a front elevation; Fig. 3, a side elevation. Fig. 4 is a transverse section, and Fig. 5 a longitudinal section.

In Patent No. 75,428, dated March 10, 1868, there is represented and described a machine for shaping and molding soles after they are attached to shoes, in which, in combination with a press, a single mold is used, while there are two lasts mounted upon a bar or carriage in such manner that either last can be adjusted under this one mold while the other last is outside of the press, the object of the improvement being to enable the operator to remove a shoe from the outside last and apply another thereto, while a third shoe is being molded. In this machine, there being only one mold, it was necessary, first, to shape or mold a batch of "rights," and then to change both of the lasts and the mold, and mold or shape a batch of "lefts," or vice versa.

The chief object of my present invention is to remedy this defect in my former machine; and in order to do so I have combined with the platen and bed of a press (capable of approaching each other, as usual in all presses) two carriages, each movable with respect to the bed or platen to which it is attached, one of these carriages being provided with two lasts, the one right and the other left, the other carriage being provided with two molds, the one right and the other left.

The construction as a whole is such that the action of the press causes one mold and one last to approach each other, to squeeze, shape, or mold a sole, while a movement of the carriages on the platen and bed will so alter the position of the mold and lasts that either a right last will be opposite a right mold or a left last opposite a left mold, so that either a left shoe-sole or a right shoe-sole may be molded at the will of the operator.

The last which is not carrying the shoe being molded occupies while the molding is progressing a place outside the press, so that a shoe with a molded sole can be removed therefrom and another shoe placed thereon.

By means of this machine rights and lefts can be molded alternately, and a shoe can be removed from its last and another placed thereon while a third shoe is being molded.

In the drawings, the frame of a press is represented at A, the bed at A′, the platen at B, mounted upon the vertically-moving rods B′ B′, united at the bottom by a cross-bar, $B^2$. Springs C C are applied to the cross-bar and to the frame to lift the platen after it has been depressed to mold a sole. Upon the bed of the press is mounted a carriage, C′, pivoted upon one of the rods B′, and free to be oscillated or revolved upon this rod. This carriage rests upon and is supported by the bed of the press, and has mounted upon it two lasts, D D′, the one a right and the other a left last, and the essentials of the structure are that the bed supports the carriage, and that the carriage supports the lasts, and can be so moved with reference to the bed that either last may be located under the center of the platen, or nearly so, and that when so centrally located the other last will be outside the press. The carriage C′ is, for the sake of convenience, provided with two stops or latches, $C^2$ $C^2$, which serve, by catching against the edge of the bed, to arrest the carriage when a last arrives in the central position to hold a shoe under its proper mold.

To the platen of the press there is attached another movable carriage, E, upon which are mounted two molds, F F, the one proper for a left, the other for a right sole. This carriage is free to slide on the platen.

The two molds are connected by dovetailed tongues and grooves, so as to permit changes of molds with the bottom of the carriage E, and the latter has tongues attached to or making a part of it, which are supported in horizontal grooves in a block, G, attached to the platen by a bolt, G′, an elastic block or cushion being interposed between the metal block G and the platen of the press, so that the molds may accommodate themselves slightly to different soles. When the platen rises or descends this carriage rises or descends.

The essential features of this part of the apparatus are the platen so moving as to squeeze or mold soles lying under the molds, and the carriage supporting two molds, the one right and the other left, this carriage moving with the platen in the act of squeezing and retreating, and, as stated above, so attached to the platen that it may be moved with reference thereto in such way that either a right or left mold may be brought under the center of the platen or thereabout, and over a last supported on the carriage mounted on the bed of the press.

Now, if the above description stated my whole invention it would be useful in this way, viz: Supposing a right mold and a right last to be opposite each other, with a shoe upon the latter. Then while the sole of this shoe is in the grasp of the press the operator can remove a shoe the sole of which has just been squeezed from the left last, then outside of the machine, and place thereon a left shoe. When the jaws of the press relax their pressure he can by hand move the last-carriage to carry the left last and shoe thereon to the center of the press, at the same time removing the right last with a molded sole to the outside of the press, and while he is moving the last-carriage with one hand he could move the mold-carriage with the other hand, so as to remove the right mold from the center of the press and bring the left mold into that central position. All parts would now be in a place to mold a left shoe and to remove a molded right shoe and substitute for it an unmolded right shoe. But in order to make the operation of the structure more convenient I conceived the idea of connecting the mold-carriage with the last-carriage in such manner that when one was moved the other would move also.

This connecting mechanism is constructed as follows: To the last-carriage a post, H, is secured, with a vertical groove in it, and around one of the rods B′ is a sleeve, H′, so supported as to be free to turn, but occupying the same relation vertically to the platen. This sleeve has attached to it a small pin, which enters the vertical groove in the post, and is furnished at its upper end with a gear, $H^2$. This gear engages with another gear, $H^3$, mounted on the platen, and this latter gear is provided with a crank-pin, on which is pivoted a connecting-rod, $H^4$. A hook on the other end of this connecting-rod hooks upon a stud, $H^5$, attached to and projecting from the side of the mold-carriage. When the last-carriage is moved to remove a last from the central to the outside position the post will turn with it, the groove in the post will force the pin projecting into it to turn, and consequently the sleeve and its attached gear will turn also. This gear will turn the gear mounted on the platen, and the crank-pin of the latter, acting on the connecting-rod, will cause the stud, and consequently the mold-carriage, to move sidewise, thus carrying a right mold into place of a left one, and vice versa.

For the purpose of permitting the tripping of the molds during the pressing without breakage or undue strain of the connecting mechanism I have contrived a small dovetailed slider, $H^5$, free to slide in a groove in the block G. This slider is furcated at its lower end, so as to embrace the stud on the mold-carriage, and the hook on the connecting-rod, instead of taking hold of this stud, takes hold of another small stud projecting from the slider. Consequently the connecting-rod moves the slider and the latter the mold-carriage. This slider is not an essential part of the connecting mechanism.

Figure 5:
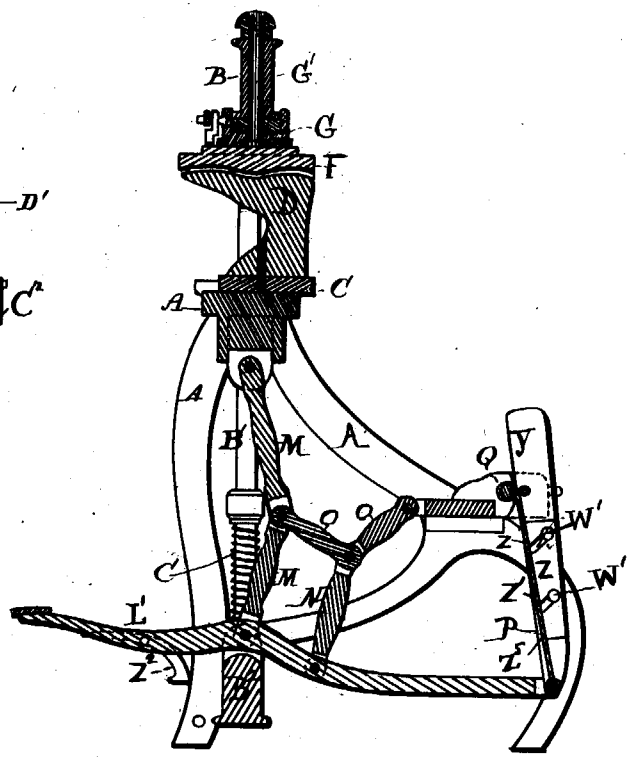

Ordinary adjusting-nuts are applied between the platen and the rods B B′, so that the former may be adjusted with reference to the throw or stroke of the press, and the lasts are, for the sake of convenience, attached to the last-carriage, so that they can be easily removed when it is desired to replace them with other lasts, as is indicated in Fig. 5 of the drawings.

I have also devised certain improvements in the mechanism for actuating a platen, specially useful in presses for molding shoe-soles, and will now proceed to describe them.

For depressing the platen B in order to force a mold upon a shoe arranged on one of the lasts, there is applied and pivoted to the lower cross-bar of the said frame a treadle or foot-lever, L′, arranged as shown, there being connected with it and the frame A two sets of toggles, M M and O O, provided with a pitman, N, all being arranged as represented. To the rear end of the lever a belt, P, is attached, fixed at its upper end to the shaft Q. The said shaft has fixed upon it, near its outer end, a ratchet-wheel, R, to engage with a pawl, S. This pawl is pivoted to one side of a friction-clutch, T, which revolves freely on the shaft and co-operates with a pulley, U, in effecting rotary motion of the shaft Q. The said pulley also revolves freely on the shaft, and has a groove, V, in and around its hub, to receive a slide-fork, W, arranged as represented, and provided with a spring, X, for retracting it.

Figure 6:
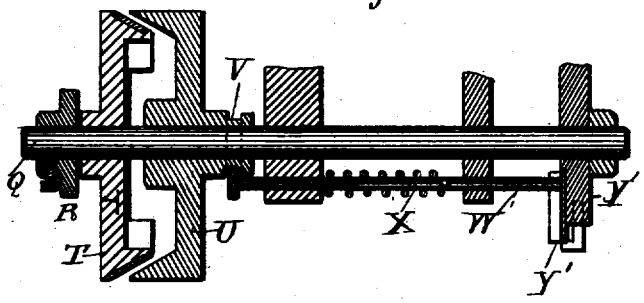

Fig. 6 is a longitudinal section of the shaft Q and its appliances.

Figure 7:
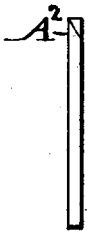

There is pivoted to the rear end of the treadle-lever L′ a thin bar, Y, which rests against a shoulder or projection, Y′, extended from the frame A, and extends between such and the inner end of the shank of the fork W. There is applied to the inner side of the bar Y a gravitating cammed slide-plate, Z, it being held to the bar Y by two headed studs, W′ W′, going through inclined slots Z′ Z′, made in said plate, in manner as shown. The plate at its upper edge is beveled or wedgeshaped, as seen at $A^2$, see Fig. 7, which is an inner-edge view of this gravitating-plate.

If we suppose a driving-belt to be running upon the pulley U the latter will be revolved on the shaft Q.

To operate the machine, an attendant is to depress with his foot the front arm of the treadle, which will descend until a lever-latch, $Z^2$, pivoted to it and arranged and provided with an operative spring, $Z^3$, as shown, may catch upon the cross-bar $Z^4$ of the frame A. In thus depressing the treadle it will raise the bar Y and the cam-plate Z thereof, carrying the latter against the end of the fork W, and thereby pushing such longitudinally, so as to force the driving-pulley against the friction-clutch in a manner to cause the pulley to revolve the clutch. As a consequence, the clutch, by means of the pawl and ratchet-wheel, will revolve the shaft Q, which will wind up the belt P, and cause it to lift the rear arm of the treadle-lever, whereby the toggles will be put in action, so as to depress the platen B. This will continue until the curved corner $Z^5$ of the cam-plate Z is raised above the end of the shank of the fork. As soon as the latter may have occurred the retraction-spring of the fork will move the fork inward, and the latter will move the driving-pulley out of engagement with the friction-clutch. As a consequence, the shaft Q will cease to be revolved by the clutch, and the latch $Z^2$ will catch upon the bar $Z^4$, and retain the parts in position during the period the attendant may desire to have pressure of the mold exerted on the shoe-sole. At the end of this period the attendant, by pressing on the tail of the lever-latch, disengages the latch from the bar, and thus sets free the treadle-lever. The platen B will next rise, and the treadle-lever be moved so as to depress the bar Y and the belt P. In being drawn downward the said belt will be unwound from the shaft Q, and will revolve it and the clutch backward. In the meantime the cam-plate Z will be moved aside by the shank of the fork, and subsequently, by gravity, will fall back underneath the shank, so as to be again ready for operating it.

The purpose of the pawl and the ratchet is to prevent the clutch, by the momentum generated in it, from continuing to revolve the shaft Q so as to overstrain or break the belt P, which would be liable to occur were the clutch fastened to the shaft. As it is, when the shaft stops the clutch will revolve without turning the shaft.

I claim as my invention—

1. In combination with the platen and bed of a press, a movable carriage on which a right and left mold are mounted, and a movable carriage upon which a right and left last are mounted, the combination being substantially as specified, whereby right and left shoes may be molded alternately, as described.

2. In combination with the platen and bed of a press, two laterally-movable carriages, the one supporting molds and the other lasts, substantially as set forth.

3. The connecting mechanism, substantially such as is specified, whereby the movement of one carriage will cause the movement of the other.

4. The combination of the treadle-lever L′ and its system of toggles with mechanism, substantially as described, for operating such lever by a belt applied to a driving-pulley, U, such mechanism consisting of the driving-pulley U, the clutch T, the shaft Q, the belt P, the fork W, the retracting-spring X, the bar Y, and the cam-plate Z, all arranged and combined, substantially as set forth.

5. The combination of the lever-operative mechanism and the pawl S and ratchet-wheel R, applied to the shaft and the clutch, the said pawl and ratchet being for the purpose specified.

6. In a machine for shaping boot and shoe soles, the combination of the lever-latch $Z^2$ and its operative spring $Z^3$ with the treadle L, provided with mechanism for operating it, as described.

JOSEPH B. JOHNSON.

Witnesses:
C. H. FISKE,
G. D. NOYES.